July 4, 1933.  H. L. SMITH  1,916,339

DYNAMO ELECTRIC MACHINE

Filed Dec. 14, 1929

Inventor:
Harold L. Smith,
By Edwin B.H. Tower, Jr.
Atty.

Patented July 4, 1933

1,916,339

UNITED STATES PATENT OFFICE

HAROLD L. SMITH, OF MILWAUKEE, WISCONSIN, ASSIGNOR TO THE LOUIS ALLIS COMPANY, OF MILWAUKEE, WISCONSIN, A CORPORATION OF WISCONSIN

DYNAMO-ELECTRIC MACHINE

Application filed December 14, 1929. Serial No. 414,063.

This invention relates to dynamo electric machines.

The dynamo electric machine to which the invention applies in particular has a closed casing to exclude ambient diffusible matter from the interior thereof or to confine the flash of an internal explosion.

Enclosed dynamo electric machines are ordinarily limited as to size or capacity due to the inability of large machines to dissipate sufficient heat.

The present invention has as an object to provide a dynamo electric machine from which heat is readily dissipated at a rapid rate.

Another object is to provide an enclosed dynamo electric machine which has a high capacity for a given sized stator core and given over all dimensions.

Other objects and advantages will appear from the description hereinafter given of a dynamo electric machine in which the invention is embodied.

According to the invention in its fundamental aspect and as ordinarily embodied in practice, a dynamo electric machine is provided with a rotor having axial passages between its winding slots and the rotor shaft, and fan blades arranged at each end of the rotor to draw air through alternate ventilating passages and discharge it in a radial direction therefrom.

The invention is exemplified by the induction motor illustrated in the accompanying drawing in which the views are as follows.

Figure 1:
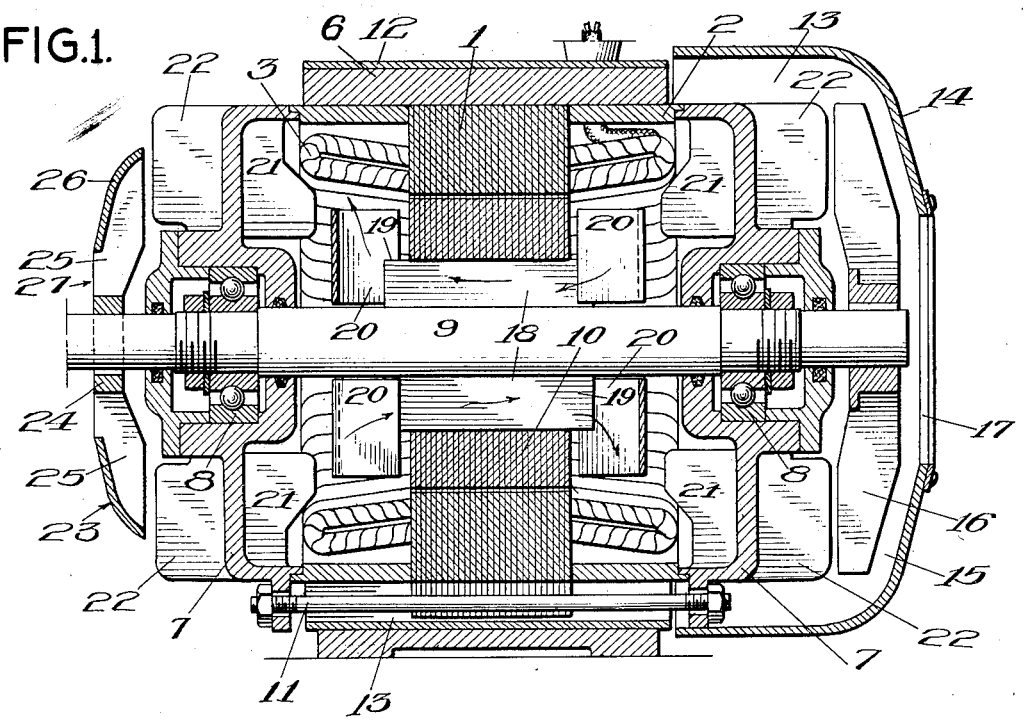
Fig. 1 is a longitudinal section through the motor.
Figure 2:
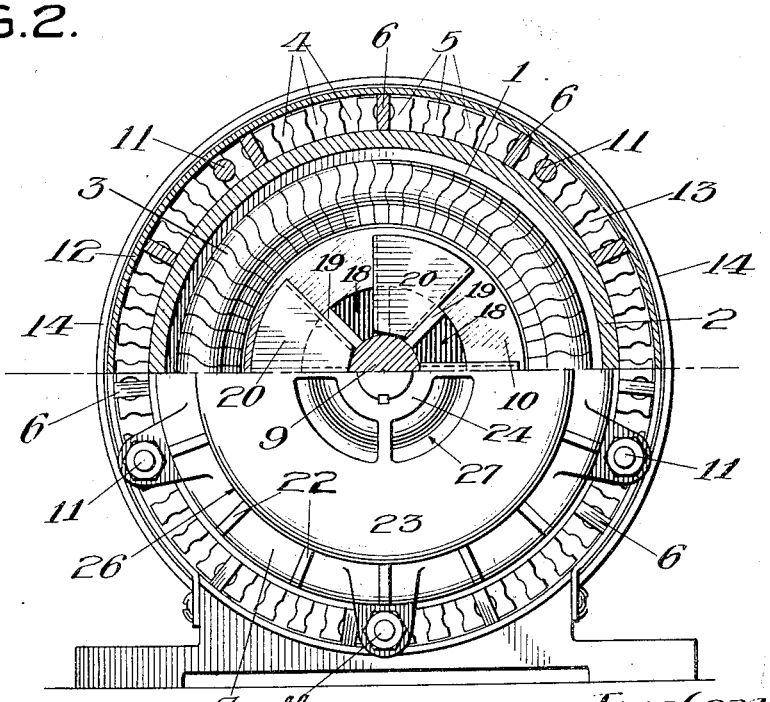
Fig. 2 is an end view partly in section.

The motor is provided with a laminated stator core 1 arranged between two end rings 2 and carrying the stator winding 3.

The core 1 has radial notches 4 formed in its periphery to provide a radial rib 5 between each two adjacent notches.

The ribs 5 increases the radiating surface of the core and function as radiators to dissipate heat from within the core.

The end rings 2 are connected to each other by connecting bars 6 which are arranged at intervals around the core 1 and fastened to each end ring by welding or otherwise.

Each bar 6 is fitted in a notch 4 to retain the core laminations in fixed positions and to provide a compact stator.

Each end ring 2 has a closed end plate 7 arranged thereon and provided at its center with a bearing 8 to support a rotor shaft 9 which carries a rotor core 10.

The core 1, the end rings 2, and the end plates 7 form a closed inner casing which excludes ambient diffusible matter from the interior of the motor.

The end plates 7 are fastened in position upon the end rings by elongated bolts 11, each of which passes through a notch 4 and connects one end plate to the other.

Each notch 4 is preferably shaped to receive either a supporting bar 6 or a bolt 11 so that any notch in one lamination may be alined with any of the notches in the other laminations when the stator core is assembled.

The bars 6 support a ventilating casing 12 which is spaced from the core 1 and the end rings 2 to provide a ventilating passage 13.

One end of the ventilating casing 12 is closed by a fan casing 14 which forms substantially a part thereof and provides a fan compartment 15 communicating with the ventilating passage 13.

The shaft 9 carries a fan 16 which is arranged in the fan compartment 15 and adapted to draw air through an inlet 17 in the fan casing 14 and force the same through the ventilating passage 13 and the notches 4.

The characteristics of the machine thus far described form no part of the present invention as the same are described and claimed in my co-pending application Serial No. 414,064 filed on even date herewith.

The present invention resides primarily in providing means for circulating air through the rotor core 10 and means for dissipating heat from the end plates 7, but is in no wise limited to the particular machine described above.

The rotor core is provided with air passages 18 which are arranged around the shaft 9 and spaced inward from the active material.

The rotor core may be secured to the shaft 9 in the usual manner and the air passages 18 formed between the shaft and the active material of the core.

The rotors of large machines may be more economically produced by securing an annular rotor core, which contains only the necessary active material, upon a spider which is rigidly secured to the rotor shaft.

The spider is formed by arranging bars 19 edgewise around the periphery of the shaft 9, rigidly securing the same thereto, as by welding, and securing the rotor core upon the outer edges of the bars 19.

The bars 19 thus divide the space between the shaft 9 and the inner periphery of the core 10 into a number of air passages 18.

Air is circulated through the passages 18 by fans 20 which are arranged at opposite ends of alternate passages 18 and secured to the rotor, as by welding the same to the ends of the bars 19.

The fans 20 are substantially U-shaped in cross section and have the side walls thereof arranged substantially upon radii of the rotor.

The inner ends of the fans 20 are arranged close to the shaft 9 so that the same are substantially closed thereby and rotation of the rotor causes air to be drawn through the passages 18 and thrown radially outward by the fans 20.

As the fans 20 are arranged at opposite ends of alternate passages 18, air is drawn in opposite directions through alternate passages and thrown radially outward from each end of the rotor 10, thus violently agitating all the air contained in the machine.

The air thrown outward by the fans 20 is deflected against the end plates 7 which absorb heat therefrom and conduct the same outward.

In order to absorb a greater amount of heat from the internally circulated air and to more readily dissipate the same, the end plates 7 are provided with heat absorbing fins 21 upon the inside thereof and heat dissipating fins 22 upon the outside thereof.

The fins 21 are capable of absorbing large quantities of heat which is conducted outward and readily dissipated by the fins 22.

A sufficient amount of heat is dissipated without the aid of the fins 21 and 22 to maintain the efficiency of the machine except in machines of very large capacity and in large machines subjected to excessive loads.

One end plate 7 and the fins 22 carried thereby are cooled by air forced against the same by the fan 16.

The other end plate 7 and the fins 22 carried thereby are preferably cooled by air drawn over the same and exhausted away from the machine by a fan 23 which is carried by the shaft 9.

The fan 23 has a hub 24 attached to the shaft 9 and fan blades 25 extending radially therefrom.

An annular shield 26, which is substantially concavo-convex in cross section, is attached to the outer edges of the fan blades 25 so that rotation of the fan causes air to be drawn over the end plate 7 and the fins 22 and exhausted away from the machine through the central opening 27 in the shield 26.

The invention herein set forth is susceptible of various modifications and adaptations without departing from the scope thereof as hereafter claimed.

The invention is hereby claimed as follows:

1. A dynamo electric machine, comprising a stator, a rotor arranged within said stator and having air passages extending axially therethrough between its winding slots and its axis, and a fan blade arranged at opposite ends of alternate passages substantially in alignment therewith and shaped to draw air through alternate passages in opposite directions and exhaust it radially outward.

2. A dynamo electric machine, comprising a stator, a rotor arranged within said stator and having axial air passages therein, and a channel-shaped fan blade arranged at opposite ends of alternate passages and having its sides forming substantially a continuation thereof and its web terminating said passage axially.

3. A dynamo electric machine, comprising a stator, a rotor arranged within said stator and having air passages extending axially therethrough between its winding slots and its axis, and a fan blade arranged at opposite ends of alternate passages and having its sides forming substantially a continuation thereof and its web terminating said passage axially.

4. A dynamo electric machine, comprising a stator, closed end plates carried by said stator and forming therewith a closed casing, a rotor shaft bearing in said end plates, a rotor carried by said shaft and having air passages extending axially therethrough between its winding slots and its axis, a fan blade arranged at opposite ends of alternate passages substantially in alignment therewith to draw its air positively therethrough and exhaust the same radially outward, fins carried by said end plates upon the inside thereof to absorb heat from the air circulated by said fans, and fins carried by said end plates upon the outside thereof to dissipate heat absorbed by said inside fins.

5. A dynamo electric machine, comprising a stator, closed end plates carried by said stator and forming therewith a closed casing, a rotor arranged within said stator and having axial air passages therein, a channel-shaped fan blade arranged at opposite ends of alternate passages and having its sides forming substantially a continuation thereof and its web terminating said passages axially, fins carried by said end plates upon the inside thereof to absorb heat from air circulated by said fans, and fins carried by said end plates upon the outside thereof to dissipate heat absorbed by said inside fins.

6. A dynamo electric machine rotor, comprising a core carried by a shaft and having axial ventilating passages extending therethrough intermediate its winding slots and said shaft, a fan arranged at each end of said rotor and rotating in synchronism with said rotor, and a blade on each fan arranged at one end of alternate passages to draw air therethrough and formed by radial vanes connected at the outer edges thereof by an intervening vane to cause the air drawn through said passages to be deflected outward in a radial direction.

In witness whereof, I have hereunto subscribed my name.

HAROLD L. SMITH.